Oct. 20, 1964   L. B. HEINY   3,153,484
GRADER
Filed May 29, 1961   4 Sheets-Sheet 2

INVENTOR.
Loyal B. Heiny
BY
Attorneys

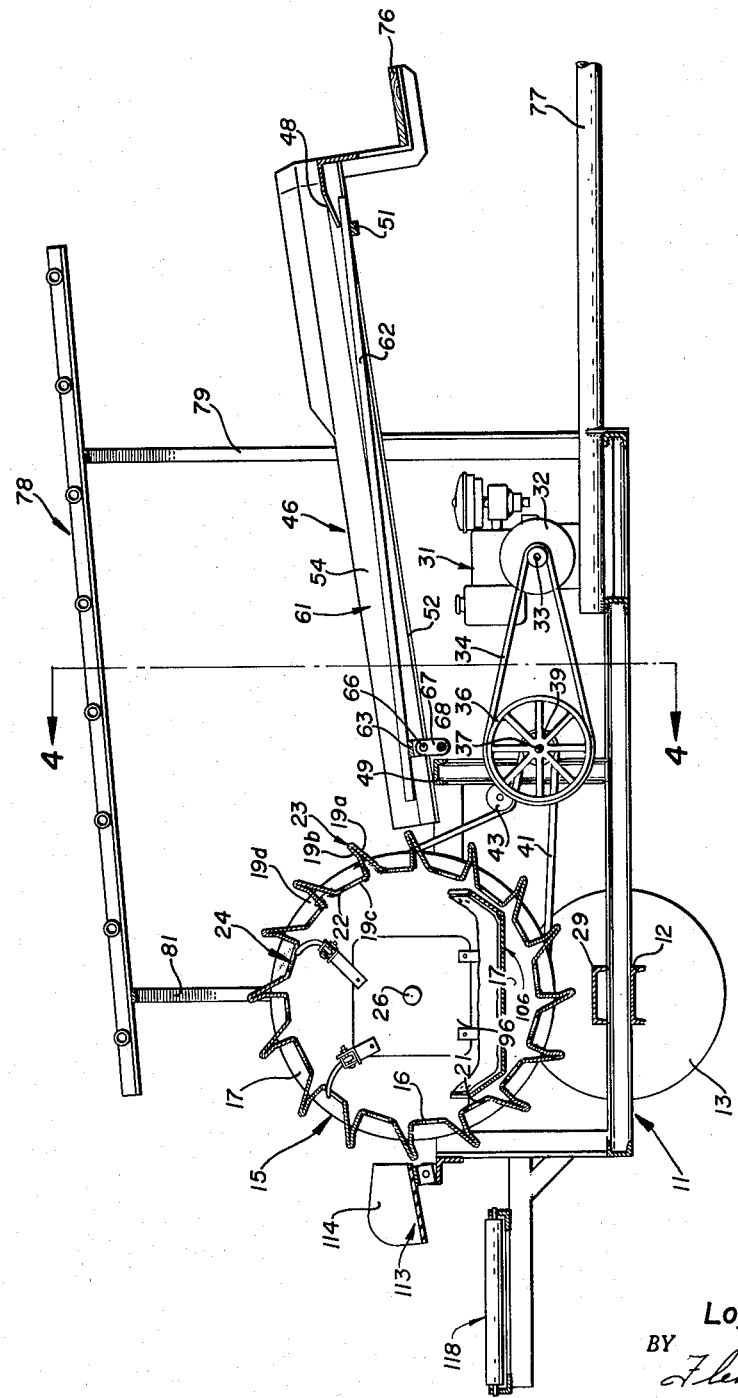

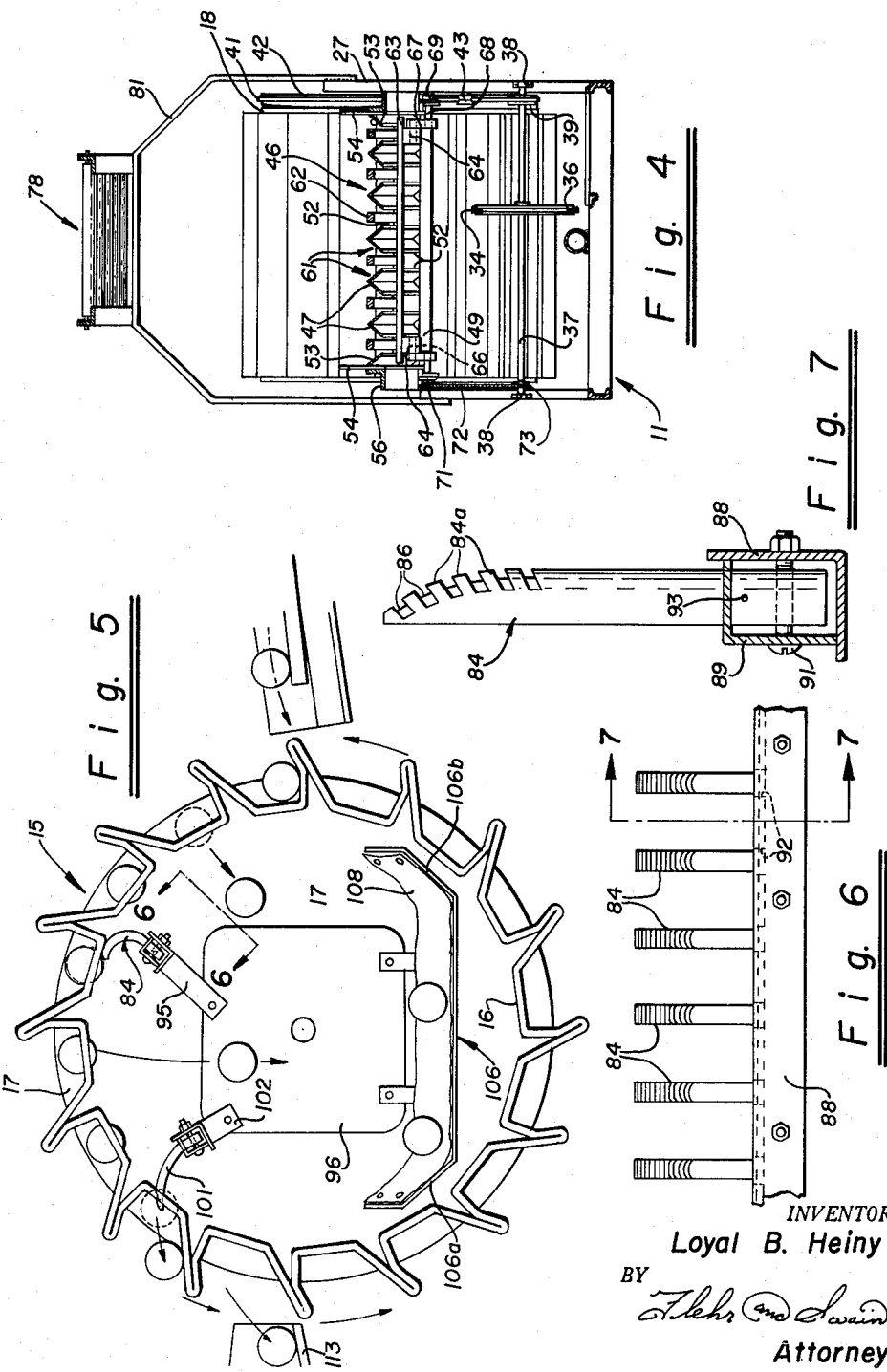

United States Patent Office 3,153,484
Patented Oct. 20, 1964

3,153,484
GRADER
Loyal B. Heiny, Rte. 1, Box 901, Modesto, Calif.
Filed May 29, 1961, Ser. No. 113,531
3 Claims. (Cl. 209—86)

This invention relates to a grader and more particularly to a grader which is adapted for grading soft skinned fruit such as peaches.

In view of the fact that canneries during the canning season in recent years have been offering premium prices for good fruit which is uniform in size, there has been a demand for graders which can be used in the orchards for grading the fruit before it is taken to the cannery. Graders heretofore, provided for this purpose have not been completely satisfactory. They have unduly damaged the fruit and have required excessive manpower for operating the same.

In general, it is an object of the present invention to provide a grader which is particularly adapted for grading soft skinned fruit.

Another object of the invention is to provide a grader of the above character which can be utilized in the fields and orchards.

Another object of the invention is to provide a grader of the above character which can be readily moved from one location to another.

Another object of the invention is to provide a grader of the above character in which the fruit as it is picked can be dumped directly into the grader.

Another object of the invention is to provide a grader of the above character in which the fruit is gently shifted and advanced in separate alleys during which time the fruit with blemishes can be removed.

Another object of the invention is to provide a grader of the above character in which the fruit is lifted and rolled into openings which size the fruit.

Another object of the invention is to provide a grader of the above character in which the undersized fruit is readily removed without damage.

Another object of the invention is to provide a grader of the above character in which the fruit is shifted in the sizing openings so that all fruit having a size smaller than the opening will drop through the openings.

Another object of the invention is to provide a grader of the above character in which the properly sized fruit is deposited in suitable containers.

Another object of the invention is to provide a grader of the above character which can be operated with a minimum of personnel.

Another object of the invention is to provide a grader of the above character which is economical to manufacture and which requires a minimum of upkeep.

Additional objects and features of the invention will appear from the following description in which the preferred embodiment is described in detail in conjunction with the accompanying drawings.

Referring to the drawing:

FIGURE 3 is a cross-sectional view taken along the line 3—3 of FIGURE 2.

FIGURE 4 is a cross-sectional view taken along the line 4—4 of FIGURE 3.

FIGURE 5 is an enlarged detail view of the grading drum.

FIGURE 6 is a view taken along the line 6—6 of FIGURE 5.

FIGURE 7 is a cross-sectional view taken along the line 7—7 of FIGURE 6.

Figure 1:
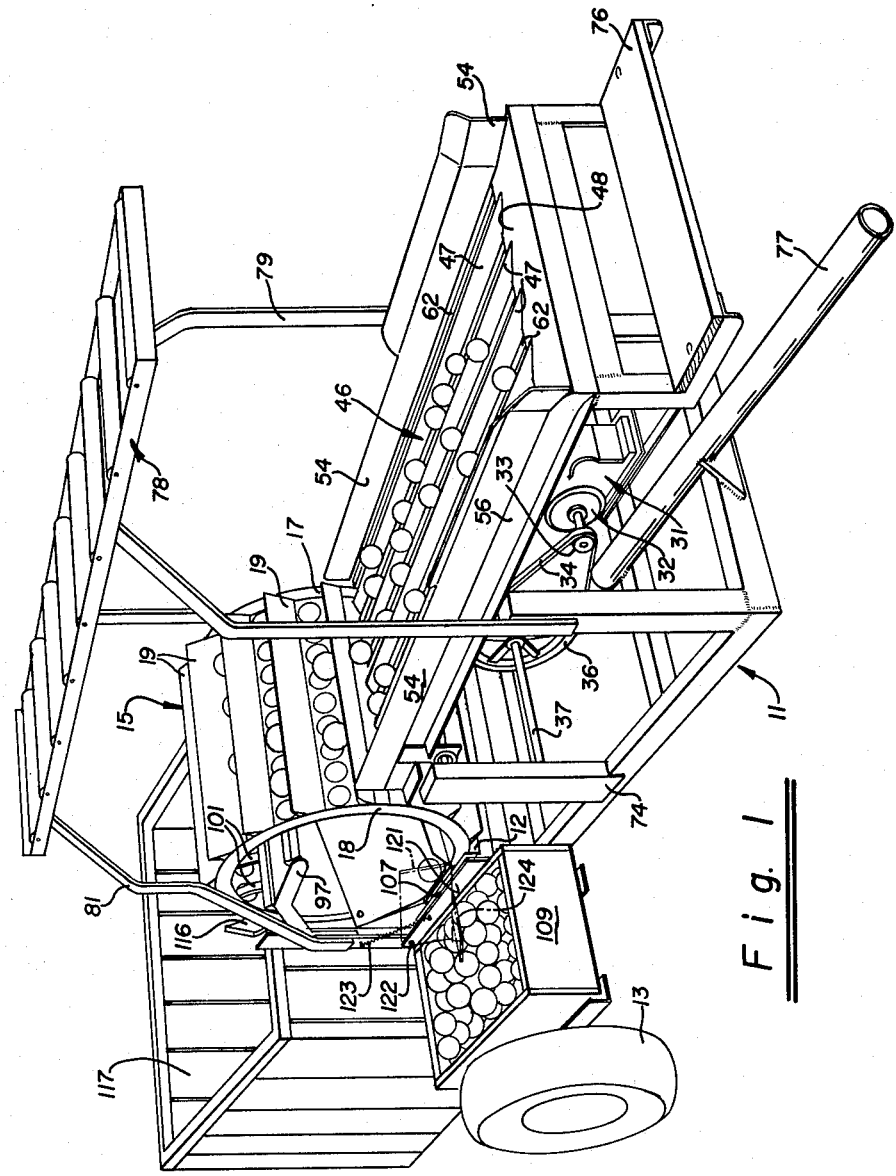
FIGURE 1 is a perspective view of a grader incorporating my invention.
Figure 2:
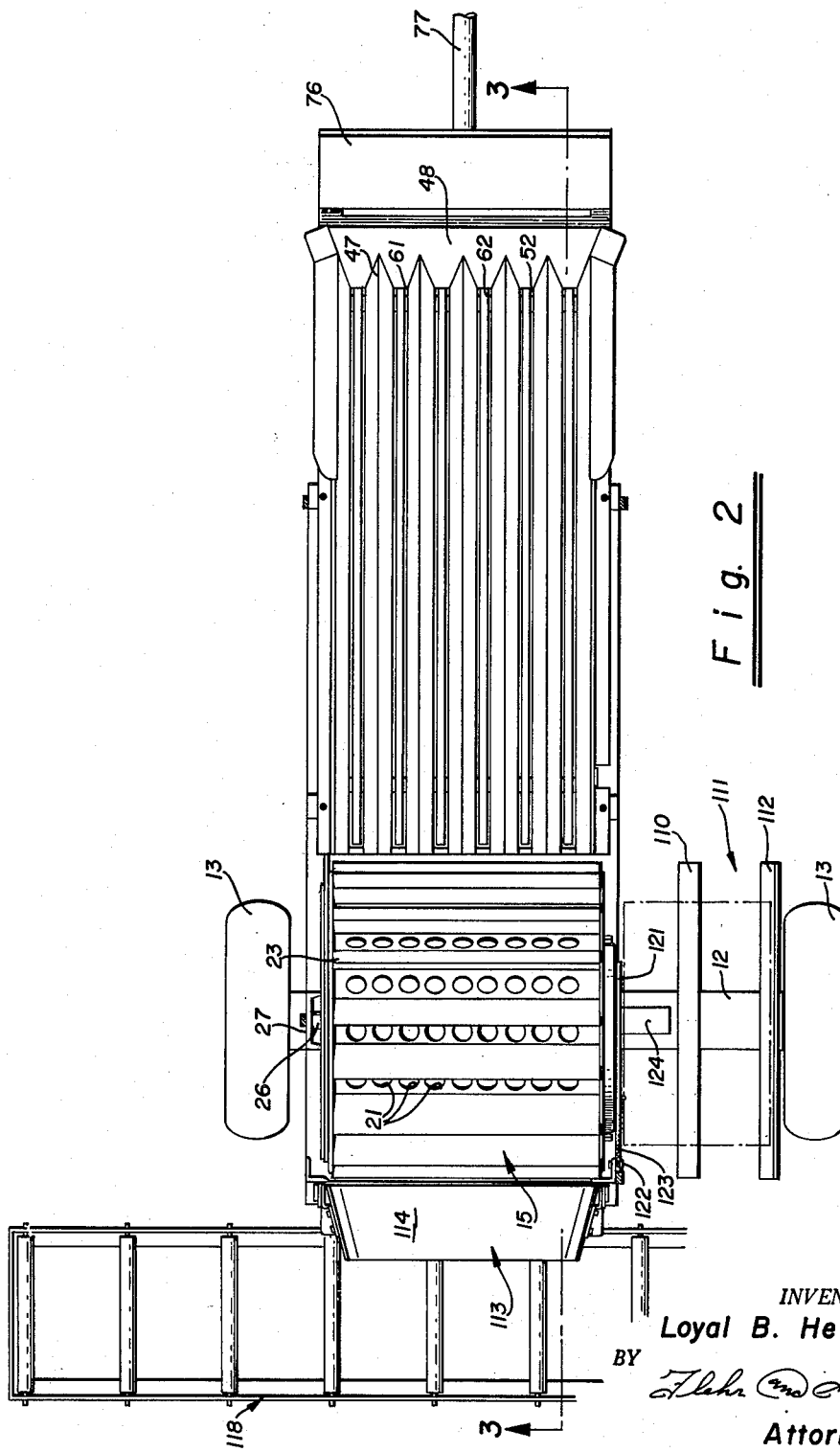
FIGURE 2 is a top plan view of the grader shown in FIGURE 1 but with an end conveyor.

In general, my grader consists of a wheeled framework upon which a drum is rotatably mounted. The cylindrical member forming a part of the drum is provided with a plurality of holes aligned in rows parallel to the rotational axis of the drum. A plurality of vanes are mounted on the member and extend outwardly from the member to provide troughs between the same parallel to the rotational axis of the drum. Conveyor-like means also serving as a dumping table is mounted on the framework and serves to deliver fruit to the troughs of the drum. Motive means provided on the framework is utilized for rotating the cylindrical member to cause the fruit to be delivered to it from the conveyor-like means. The drum raises the fruit from the conveyor-like means and rolls it into openings in said drum so that under-sized fruit can drop through the openings and into the drum as the drum is rotated. Means is provided for removing the undersized fruit from the drum and additional means is provided for collecting the properly sized fruit as it is discharged from the drum.

More in particular and as shown in the drawings, my grader consists of a wheeled framework 11 which includes a transverse channel member 12 upon which is rotatably mounted a pair of rubber tired wheels 13. It will be noted that one wheel extends outwardly a substantial distance from the main portion of the framework 11 for a purpose hereinafter described.

A large drum 15 is rotatably mounted in one end of the framework 11 with its axis of rotation parallel to the axis of the wheels 13. The drum consists of a cylindrical member 16 with a circular plate 17 mounted on one end and an annular rim 18 on the other end. The drum 15 is formed by a plurality of transverse members 19 of suitable material such as steel which are fixed to the circular plate 17 and the rim 18 by suitable means such as welding. Each of the members 19 consists of a straight inclined portion 19a which extends outwardly from the center of the drum 15 and another portion 19b which is folded over on portion 19a and extends back in the opposite direction, a portion 19c which extends outwardly from the base part of portion 19a, and another portion 19d which lies in a plane which forms a chord on the circumference of the drum. A plurality of equally spaced holes or openings 21 are provided along the length of portion 19d. The holes are of a predetermined size as for example 2⅜ inches in diameter, for grading purposes as hereinafter described.

The members 19 are secured to each other along weld lines 22 to complete the drum. When secured together in this manner, the portions 19d form the cylindrical member 16 and also form vane-like members 23 which extend outwardly from the axis of the drum 15 in a generally radial direction. These vanes or vane-like members 23 form troughs 24 between the vanes and extend transversely of the drum and generally overlie the rows of openings or holes 21 provided in the members 19.

The drum 15 is rotatably mounted upon the framework 11 by a shaft 26 which is secured to the circular plate 17 and is rotatably carried in a vertical support member 27 secured to the transverse channel member 12 of the framework 11. An additional transverse channel member 29 is provided as a part of the framework 11 to give additional rigidity to the support member 27.

Motive means mounted on the framework 11 is provided for rotating the drum 15 and consists of a suitable source of power such as a gasoline engine 31 driving a speed reducer 32. The speed reducer 32 is provided with a pulley 33 which drives a belt 34. The belt 34 drives a large pulley 36 mounted on a jack shaft 37. The jack shaft 37 extends laterally of the framework 11 and is rotatably supported in pillow blocks 38 mounted on the framework 11. Another pulley 39 is fixed to the jack shaft and drives a belt 41. The belt 41 is reeved about a large pulley 42 which is secured on the outer side of the circular member of the drum 15 and serves to rotate the drum 15 in a counter-clockwise direction as viewed in FIGURE 3. A belt tightener 43 mounted on a portion of the frame 11 is provided for tightening the belt 41.

Conveyor-like means 46 is mounted on the front end of the framework 11 and is utilized for delivering the fruit to be graded to the drum 15. The conveyor-like means 46 consists of a plurality of inverted V-shaped members 47 which have their front ends secured to a downwardly inclined portion of a member 48 and which have their rear ends supported upon a laterally extending bar 49. The forward ends of the inverted V-shaped members 47 also rest upon a laterally extending bar 51 mounted on the forward end of the conveyor-like means. The inverted V-shaped members 47 are spaced in such a manner that slots 52 extending longitudinally of the conveyor are provided between the lower extremities of the inverted V-shaped members 47. Additional inclined members 53 are provided on the outside of the last of the inverted V-shaped members 47 on each side of the conveyor-like means and are secured to the upstanding side members 54 of the conveyor-like means. The side members 54 are secured to angle members 56 which extend the length of the conveyor.

It can be seen from the drawings that the inverted V-shaped members 47 provide V-shaped alleys or troughs 61 with slots in the bottom portions thereof extending longitudinally of the alleys. The alleys are positioned in such a manner that they incline downwardly towards the drum 16 so that the fruit or other articles placed thereon will have a tendency to roll down and be guided into the drum 15. The conveyor-like means also serves as a dump table for receiving the fruit as it is picked by the pickers as hereinafter described.

Additional means in the form of a fruit or article shifting assembly is provided as a part of the conveyor-like means to ensure that the fruit or other articles placed thereon will be advanced into the drum and consists of rods 62 which are disposed in the slots 52 between the inverted V-shaped members as shown particularly in FIGURES 3 and 4. The forward ends of the rods 62 rest upon the bar 51. The rear ends of the bars are carried by a laterally extending member 63. The member 63 is supported by a pair of bushings 64 rotatably mounted upon pins 66 affixed to crank members 67. The crank members 67 are affixed to shafts 68 which are rotatably carried by bearings 69 mounted on the framework 11. The left hand shaft of shafts 58 as viewed in FIGURE 4, is affixed to a sprocket wheel 71 which is driven by a chain 72. The chain 72 is driven by a sprocket wheel 73 affixed to the jack shaft 37. A protective shield 74 is provided for enclosing the chain drive for the fruit shifting assembly.

A platform 76 is provided on the front end of the conveyor-like means as shown particularly in FIGURES 1 and 3 for a purpose hereinafter described. A tongue 77 is affixed to the forward end of the framework 11 and is provided so that the grader can be towed from one position to another behind a tractor or other suitable pulling apparatus. A conveyor 78 inclined downwardly toward the rear is mounted above the conveyor-like means 46 and above the drum 15. It is supported above the framework 11 by a pair of substantially vertical support members 79 provided on the front end of the framework 11 and a pair of support members 81 provided on the rear of the framework 11.

Means is provided for shifting the position of the articles or fruit after they have rolled into the holes in the drum 15 and consists of pliable fingers 84 of suitable material such as rubber. The fingers 84 are provided with a rounded surface 84a to give a semi-tapered effect to the fingers. The fingers are also provided with serrations 86 to increase the frictional engagement. The fingers 84 are arranged in a row parallel to the rotational axis of the drum and are in alignment with the holes in the drum 15 so that they come into engagement with the holes in the drum 15 after the holes have passed a substantial distance beyond the position in which the fruit is picked up by the vanes in which the holes lie.

The fingers can be mounted in any suitable manner; for example, as shown in FIGURE 7, they can be mounted in a pair of angle members 88 and 89 fastened together by bolts 91. The fingers are mounted in holes 92 provided in the angle member 89 and are held in place by a small steel wire 93 which extend through the finger and beyond the extremities of the hole 92. The angle members 88 and 89 at one end are supported by a bracket 95 secured to the end plate 96 supported by the shaft 26 and at the other end by a member 97 which extends outside of the drum and which is secured to the framework 11.

Means is also provided for facilitating removal of the fruit or articles from the drum after they have been graded and consists of a plurality of fingers 101 which are mounted in the same manner as fingers 84 and are supported by a bracket 102 affixed to the plate 96 and to an intermediate portion of the member 97. The fingers 101 are arranged in a row which is parallel to the rotational axis of the drum 16 and are aligned with the holes in the drum so that they engage the articles or fruit in the openings in the drum to eject the fruit or articles as hereinafter described.

Means is provided for collecting the undersized articles or fruit after they drop through the holes in the drum and consists of a trough 106 extending within the drum and supported upon a vertical plate 107 mounted on the framework 11. The trough 106 is inclined upwardly into the drum and is provided with upwardly turned side edges 106a and 106b. The trough 106 is provided with suitable covering 108 to cushion the fall of the fruit as it drops through the holes in the drum. This covering can be of any suitable material such as rubber. The lower end of the trough 106 is positioned so that the fruit or articles as they roll off of the trough can roll into a box 109 or other suitable container mounted upon the platform 111, provided by the angle member 112 and the member 110 affixed to the channel member 12. Gate means is provided for preventing the fruit or articles from passing from the trough 106 when a box 109 is not in position on the platform 111. It consists of a plate member 121 lying in a plane parallel to the end of the drum 15 and pivoted at 122. The gate member 121 is yieldably urged in an upward direction by a spring 123 secured to the frame and gate member 121. In this position the gate member 121 prevents the fruit from rolling from the trough. The gate member 121 is provided with a post 124 which is adapted to be engaged by the box 109 to lower the gate member 121 against the force of the spring 123 to permit the fruit to roll into the box.

Means is provided for receiving the properly sized fruit or articles as they are discharged from the drum and consists of a chute 113 which is supported upon the framework 11. The chute 113 consists of a U-shaped member 114 which carries a U-shaped member of suitable resilient material such as rubber. The chute 113 is adapted to deposit the fruit or articles in boxes 119 carried by a conveyor 118 mounted upon the framework 11 as shown in FIGURE 1. If desired, the conveyor 118 can be eliminated and the fruit can be deposited by the chute 113 directly into a large bulk box 117 as shown in FIGURE 1.

Operation and use of my grader may now be briefly described as follows. Let it be assumed that the grader has been constructed so that it is particularly suitable for the grading of peaches and that the holes 21 provided in the drum have been sized so that all peaches which do not pass through the holes can be classified as No. 1 peaches. For example, the holes can be sized so that they have a diameter of 2⅜ inches to provide such peaches. Also, let it be assumed that it is desired to utilize the grader for grading fruit in a peach orchard. The grader is first towed to the desired position in the orchard and the gasoline motor is started. The peaches as they are picked are dumped by the pickers into the conveyor-like means 46 which serves as a downwardly sloping dumping table. The peaches have a tendency to roll towards the rotating drum 16 because of the slope of the table 46. As explained previously the inverted V-shaped members 47 define alleys 61 which extend along the length of the sloping table and serve to guide the peaches in aligned rows toward the drum 16.

The agitator rods 62 of the fruit shifting assembly are periodically raised into the slots 52 and into engagement with the peaches and lift the peaches from the V-shaped alleys 61 and advance the peaches forwardly towards the drum 15. This upward lifting and then the forward advancement of the peaches in the troughs is caused by the crank members 67 which are rotated by the gasoline engine through the drive means as hereinbefore described.

It has been found that this means for advancing the peaches is particularly effective in that it makes it possible to advance the peaches without bruising or scarring the same. Also, it makes it possible for the peaches to easily shift their positions so that graders standing by the sloping table can easily pick out peaches which have blemishes or which have been damaged during picking. Thus, the action of the fruit shifting assembly is to keep the fruit moving downwardly in the alleys but it also tends to roll the fruit over so that all sides of the fruit can be viewed.

As the peaches are advanced to the end of the sloping table, the peaches roll into and are picked up by the vanes 23 which form a part of the drum, as shown particularly in FIGURE 5, at the time that they are discharged from the sloping table. The peaches are lifted as the drum is rotated and as the drum continues its counter-clockwise rotation, the peaches roll into the holes 21 provided in the drum. If the peaches are definitely under-sized, they immediately fall through the holes in the drum and drop onto the sloping trough 106 and fall into the box 109 positioned adjacent one of the wheels 13.

Before the fruit has passed over the top center position of the drum, the fruit is engaged by the pliable fingers 84 which serve to rotate and shift the fruit within the holes to ensure that any under-sized fruit will drop through the holes. All the fruit which does not pass through the holes is carried by the drum and is finally discharged into the chute 113. As hereinbefore described, additional fingers 101 are provided for engaging the holes in the drum and serve to eject the fruit from the holes as shown particularly in FIGURE 5 to ensure that none of the fruit becomes stuck in the holes and is carried around the drum.

The fruit as it passes from the chute 113 can be placed in boxes 119 mounted on a conveyor 118 or it can be discharged directly into large bulk bins 117. When boxes are utilized during the picking operation, the boxes can be placed upon the platform 76 before they are dumped. After they are dumped, they can be placed on the conveyor 78 above the dumping table and passed down to the other end of the grader and utilized for catching the top-grade fruit.

I have found that this grader makes it particularly easy to grade fruit in the orchard with a minimum of help. For example, it is possible for two people to operate the grader with one person watching the peaches as they are dumped onto the dumping table and removing all those peaches with blemishes and with the other person watching the flow of peaches into the pickling peach box 109 and into the boxes 119 or the bulk boxes 117.

The grader has been found to perform very accurate grading with very little, if any, damage to the fruit. The grader has made possible faster harvesting of the crop because it is possible for the pickers to strip the trees completely and then letting the grader do the sorting of the fruit.

Since the grader is mounted on wheels, it can be readily moved through the orchard as picking proceeds in the orchard.

It is apparent from the foregoing that I have provided a new and improved grader that is particularly adapted for grading fruit. It, however, has many features which adapt it for grading of other types of articles.

I claim:

1. In a grader having a framework, a cyclically driven drum having a plurality of openings formed therein and carried by said framework and disposed to receive and transport generally spherical articles to be graded, means for directing said articles to roll into said openings so that undersized articles fall through the openings, means for reorienting the articles in said openings at a position in the transport thereof permitting said reoriented articles to fall through said openings by tending to ensure that all undersized articles fall through the openings, said means for reorienting the articles being mounted within said drum engaging the articles in the openings to reorient said articles in the openings, and a region disposed downstream of the article engaging means and underlying the path of said openings, said region extending sufficiently along said path and being sufficiently unobstructed thereunder to permit the reoriented undersized articles to drop through the holes in the drum, said means for reorienting the articles including deformable fingers aligned with the openings and normally extending through the openings, each of said fingers having a plurality of serrations formed therein serving to facilitate engagement of the articles.

2. In a grader, a framework, a drum rotatably mounted on the framework for rotation about a horizontal axis, a plurality of holes of a predetermined size in said drum and aligned in rows parallel to the axis of rotation of the drum, a plurality of vanes mounted on the drum and extending outwardly therefrom in a generally radial direction to provide horizontal troughs between the same overlying said rows of holes, means for rotating said drum, means outside the drum for delivering articles to said drum on one side of said drum substantially below the top of the drum, the vanes being disposed so that they are adapted to receive the articles as they are delivered and to lift the articles as the drum is rotated, the articles rolling into the holes in the drum as they are lifted by the vanes, the undersized articles falling by gravity through the holes in the drum, means mounted within the upper portion of the drum for engaging and reorienting any of the remaining articles in the holes shortly prior to the time the articles reach the uppermost point of travel on the drum so that the undersized articles that have been reoriented will fall through the holes and into the drum, means for removing the undersized articles from the drum after they have dropped through the holes in the drum, and means mounted outside and adjacent the other side of said drum for receiving all articles from said drum which have not fallen through the holes in said drum, said means for reorienting the articles including a plurality of resilient rubber-like fingers spaced longitudinally of the drum and substantially in alignment with said holes, said fingers being normally disposed to extend into each passing hole to shift any article lodged therein and being deformed from their normal positions as the drum passes the same.

3. A grading apparatus as in claim 2 adapted for use with article containers wherein the means for removing the undersized articles includes an inclined trough mounted within the drum in a stationary position, gate means disposed at one end of the trough and movable in relation to said trough between article blocking and article passing positions, and yieldable means connected between said framework and said gate means and conditioned to urge said gate means to said article blocking position, said gate means including a horizontally planar projecting portion secured thereto and extending in a direction away from said trough and adapted to receive an article container, said article container and said yieldable means having a relationship so that when an article container is placed on a projecting portion, said gate means is moved to an article passing position against the force of the yieldable means.

References Cited in the file of this patent

UNITED STATES PATENTS

| | | |
|---|---|---|
| 533,716 | Luce | Feb. 5, 1895 |
| 1,521,929 | Carter | Jan. 6, 1925 |
| 1,581,247 | Thomas | Apr. 20, 1926 |
| 2,554,939 | Chapman | May 29, 1951 |
| 2,875,894 | Nelson | Mar. 3, 1959 |
| 2,896,384 | Carlsen | July 28, 1959 |

FOREIGN PATENTS

| | | |
|---|---|---|
| 1,115,036 | France | Dec. 26, 1955 |